United States Patent
Rajan Kesavelu Shekar et al.

(10) Patent No.: US 11,173,933 B2
(45) Date of Patent: Nov. 16, 2021

(54) SYSTEM AND METHOD FOR MONITORING A MOVING VEHICLE

(71) Applicant: NXP B.V., Eindhoven (NL)

(72) Inventors: Pramod Rajan Kesavelu Shekar, Bangalore (IN); Anand Shirwal, Bangalore (IN)

( * ) Notice: Subject to any disclaimer, the term of this patent is extended or adjusted under 35 U.S.C. 154(b) by 19 days.

(21) Appl. No.: 16/731,653

(22) Filed: Dec. 31, 2019

(65) Prior Publication Data

US 2021/0146977 A1 May 20, 2021

(30) Foreign Application Priority Data

Nov. 15, 2019 (IN) .............................. 201911046682

(51) Int. Cl.
*B61L 23/04* (2006.01)
*B61K 9/08* (2006.01)

(52) U.S. Cl.
CPC .............. *B61L 23/041* (2013.01); *B61K 9/08* (2013.01)

(58) Field of Classification Search
CPC ................................ B61L 23/041; B61K 9/08
See application file for complete search history.

(56) References Cited

U.S. PATENT DOCUMENTS

| | | | |
|---|---|---|---|
| 7,999,848 B2 | 8/2011 | Chew | |
| 9,194,948 B1* | 11/2015 | Leonard | G01S 13/89 |
| 10,573,184 B1* | 2/2020 | Pandit | G06F 16/29 |
| 2008/0055103 A1* | 3/2008 | Koide | B66F 9/072 340/686.6 |
| 2010/0161195 A1* | 6/2010 | Shin | B60W 50/0097 701/93 |
| 2011/0025484 A1* | 2/2011 | Mullick | B60Q 1/50 340/438 |
| 2013/0214925 A1* | 8/2013 | Weiss | G08B 25/001 340/539.11 |
| 2015/0009331 A1 | 1/2015 | Venkatraman | |
| 2015/0054658 A1* | 2/2015 | Kosatka-Pioro | G08G 1/096783 340/905 |
| 2016/0240084 A1* | 8/2016 | Takeuchi | B60T 17/22 |
| 2016/0376031 A1* | 12/2016 | Michalski | G05D 1/0669 701/15 |
| 2017/0168503 A1* | 6/2017 | Amla | B60W 30/00 |
| 2017/0178352 A1* | 6/2017 | Harmsen | G06T 17/05 |

(Continued)

FOREIGN PATENT DOCUMENTS

| | | |
|---|---|---|
| CN | 105501248 A | 4/2016 |
| CN | 107097810 A | 8/2017 |

*Primary Examiner* — Joseph Suh

(57) ABSTRACT

A system includes a drone for monitoring a second vehicle moving along a route. The drone includes a processing unit, a speed control unit, a sensor system, and a communication module. The processing unit determines a braking distance for the second vehicle in response to a current speed of the second vehicle and determines a leading distance for the drone based on the braking distance. The speed control unit adjusts a guide speed and a position of the unmanned vehicle such that the drone travels ahead of the second vehicle by at least the leading distance. The sensor system detects a hazardous condition along the route ahead of the unmanned vehicle, and the communication module enables a wireless communication link between the drone and the second vehicle for notifying the second vehicle of the hazardous condition.

19 Claims, 9 Drawing Sheets

(56) References Cited

U.S. PATENT DOCUMENTS

| | | | |
|---|---|---|---|
| 2017/0255824 A1* | 9/2017 | Miller | B61L 27/0088 |
| 2017/0301237 A1* | 10/2017 | MacNeille | H04W 68/005 |
| 2018/0170414 A1 | 6/2018 | Arndt et al. | |
| 2018/0210463 A1* | 7/2018 | Switkes | G05D 1/0293 |
| 2018/0321693 A1 | 11/2018 | Tu | |
| 2019/0047564 A1* | 2/2019 | Brady | B60W 30/181 |
| 2019/0054937 A1 | 2/2019 | Graetz et al. | |
| 2019/0106136 A1* | 4/2019 | Nishinaga | B61L 25/021 |
| 2020/0349833 A1* | 11/2020 | Lerner | G06N 20/00 |
| 2020/0408553 A1* | 12/2020 | Matsumoto | G01C 21/36 |

* cited by examiner

SYSTEM AND METHOD FOR MONITORING A MOVING VEHICLE

TECHNICAL FIELD OF THE INVENTION

The present invention relates generally to systems and methodology for monitoring a moving vehicle. More specifically, the present invention relates to real time autonomous positioning and navigation of an unmanned vehicle ahead of a monitored moving vehicle for detecting hazardous conditions and for enhancing operational efficiency.

BACKGROUND OF THE INVENTION

A constant concern exists as to the safety of vehicular travel. Despite the significant advances in technology utilized in vehicles such as trains, highway vehicles, and the like, accidents due to hazardous conditions along a route of travel, human error, excess speed, and the like continue to occur. Furthermore, such accidents are generally catastrophic in nature. By way of example, casualties due to train accidents are reported globally. The major causes of train accidents are obstructions along the train routes (e.g., human, animals, vehicles, landslides, and so forth), excess speed, unnoticeable track faults, signaling error, human error, and so forth. Accordingly, a continuous need exists to reduce the quantity of vehicular accidents and thereby reduce the number of casualties due to such accidents.

SUMMARY

Aspects of the disclosure are defined in the accompanying claims.

In a first aspect, there is provided a system comprising an unmanned vehicle for monitoring a second vehicle moving along a route. The unmanned vehicle comprises a processing unit configured to determine a braking distance for the second vehicle in response to a current speed of the second vehicle and determine a leading distance for the unmanned vehicle based on the braking distance, wherein the braking distance characterizes a travel distance that the second vehicle will move from an initial location at which braking is initiated to a final location at which the second vehicle stops moving; a speed control unit in communication with the processing unit and configured to adjust a guide speed and a position of the unmanned vehicle such that the unmanned vehicle travels ahead of the second vehicle by at least the leading distance; a sensor system configured to detect a hazardous condition along the route ahead of the unmanned vehicle; and a communication module configured to enable a wireless communication link between the unmanned vehicle and the second vehicle for notifying the second vehicle of the hazardous condition.

In a second aspect, there is provided a method utilizing an unmanned vehicle for monitoring a second vehicle moving along a comprises determining a braking distance for the second vehicle in response to a current speed of the second vehicle, the braking distance characterizing a travel distance that the second vehicle will move from an initial location at which braking is initiated to a final location at which the second vehicle stops moving; determining a leading distance for the unmanned vehicle based on the braking distance, wherein the leading distance is no less than the braking distance; adjusting a guide speed and position of the unmanned vehicle such that the unmanned vehicle travels ahead of the second vehicle by at least the leading distance; detecting a hazardous condition along the route ahead of the unmanned vehicle; and notifying the second vehicle of the hazardous condition via a wireless communication link.

BRIEF DESCRIPTION OF THE DRAWINGS

The accompanying figures in which like reference numerals refer to identical or functionally similar elements throughout the separate views, the figures are not necessarily drawn to scale, and which together with the detailed description below are incorporated in and form part of the specification, serve to further illustrate various embodiments and to explain various principles and advantages all in accordance with the present invention.

DETAILED DESCRIPTION

In overview, the present disclosure concerns systems and methodology for real time autonomous positioning and navigation of an unmanned vehicle ahead of a monitored moving vehicle for detecting hazardous conditions. More particularly, the system and methodology enable real time positioning and speed control of the unmanned vehicle such that the unmanned vehicle travels ahead of the monitored vehicle by at least a guide distance corresponding to a safe braking distance of the monitored moving vehicle. The unmanned vehicle includes a sensor system for detecting hazardous conditions (e.g., obstacles, excess speed, deviation from a predetermined route, and so forth) along the route taken by the monitored vehicle and can notify the monitored vehicle in advance of its safe braking distance so that the monitored vehicle can take appropriate corrective actions. In some embodiments, the unmanned vehicle can perform real time calculations of the optimum speed for the monitored vehicle by using preloaded route information and real time environmental conditions. In some embodiments, the system may include paired unmanned vehicles in which one unmanned vehicle travels ahead of the monitored vehicle and the other unmanned vehicle resides at a charging pad on the monitored vehicle. Accordingly, the unmanned vehicles may exchange their positions based on the power profiles and/or functionality of the unmanned vehicles. The description provided below relates to monitoring a moving train utilizing an unmanned aerial vehicle, commonly known as a drone. It should be appreciated, however, that embodiments described below may be generalized to other vehicles to be monitored, such as highway vehicles, convoys of highway vehicles, ships, and so forth.

The instant disclosure is provided to further explain in an enabling fashion at least one embodiment in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It should be understood that the use of relational terms, if any, such as first and second, top and bottom, and the like are used solely to distinguish one from another entity or action without necessarily requiring or implying any actual such relationship or order between such entities or actions.

Figure 1:
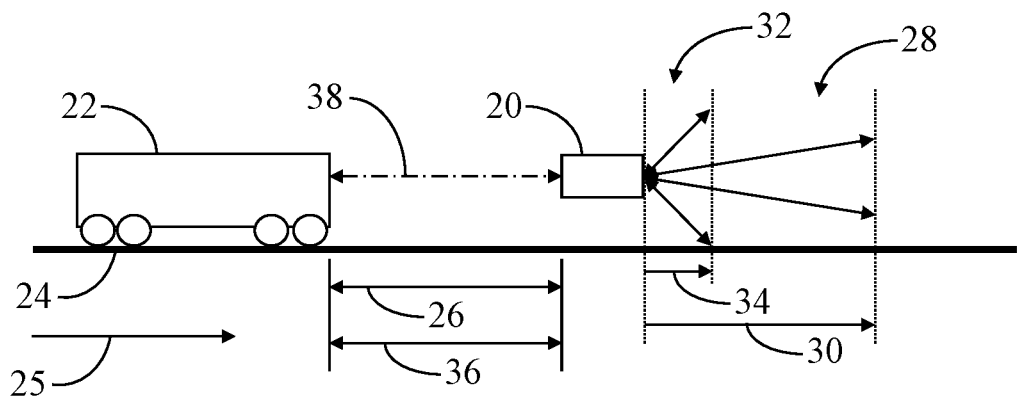
FIG. 1 shows an example of an unmanned vehicle interacting with a vehicle to be monitored.

Referring to FIG. 1, FIG. 1 shows an example of an unmanned vehicle 20 interacting with a vehicle 22 to be monitored. Unmanned vehicle 20 may be any of a number of vehicles including, for example, unmanned aerial vehicles (UAV), unpiloted aerial vehicles, remotely piloted aircraft, unmanned aircraft systems, any aircraft covered under Circular 328 AN/190 classified by the International Civil Aviation Organization, and so forth. As an example, unmanned vehicle 20 may be in the form or a single or multi-rotor copter (e.g., a quadcopter) or a fixed wing aircraft. In addition, certain aspects of the disclosure may be utilized with other types of unmanned vehicles (e.g., wheeled, tracked, spacecraft, and/or water vehicles). For simplicity, unmanned vehicle 20 will be generally referred to herein as a drone 20.

The vehicle to be monitored by drone 20 will be referred to herein as monitored vehicle 22. Monitored vehicle 22 may be any of a variety of vehicles including trains, trucks, convoys of vehicles, emergency vehicles, watercraft, spacecraft, and so forth. Additionally, monitored vehicle 22 may be under the command of a driver, engineer, or pilot or monitored vehicle 22 may an autonomous vehicle (e.g., self-driving vehicle, driverless vehicle, or any other vehicle that can guide itself without human conduction). In this example, vehicle 22 may be a train in which a series of connected vehicles are pulled by one or more engines along a railroad track 24, and may be used to transport cargo and/or passengers. The path that railroad track 24 follows is generally referred to herein as a route 25. In general, railways have a significantly better safety record as compared with, for example, road transportation. However, rail accidents continue to occur, often with catastrophic outcomes. Rail accidents can include collisions, derailments, drivers' errors, signalmen's errors, civil engineering failures, track obstructions, natural causes, and so forth.

Of particular concern with some monitored vehicles (e.g., monitored vehicle 22) is the braking distance. Braking distance refers to the distance that a vehicle will travel from the point when its brakes are applied to when the vehicle comes to a complete stop. Thus, as used herein, the term "braking distance" characterizes an initial location at which braking is initiated to a final location at which the vehicle stops moving. There are a number of factors which affect the braking distance of a vehicle. These factors include, in part, the current speed (velocity) and mass of the vehicle and the elevation variability of the route to be traveled. In the example of the train, the braking distance depends at least in part on the current speed (velocity) of the train, mass of the train, and elevation variability of the railroad track. The kinetic energy, $E_K$, of a vehicle can be characterized as follows:

$$E_K = \tfrac{1}{2}mv^2 \quad (1)$$

That is, the kinetic energy of a moving vehicle is one half times its mass times the square of its velocity. In an example, a train moving at 100 km/h (kilometers per hour) will have four times more kinetic energy as compared to a train moving at 50 km/h and having the same mass. Similarly, the mass of trains typically vary. For example, a twenty-four coach train may have approximately two times the mass then that of a twelve coach train. The braking distance will also depend upon whether the train is traveling downhill or uphill. In order to stop a train, all of its kinetic energy must be removed in order for the train to come to a state of rest. The average freight train is about 1.6 to 2 km (kilometers) in length (90 to 120 rail cars). When such a freight train is moving at approximately 90 km/h it may take 1.6 kilometers or more to stop after the locomotive engineer fully applies the emergency brake. In another example, an eight-car passenger train moving at approximately 130 km/h needs approximately 1.6 kilometers to stop. Accordingly, a safety system onboard a train may not provide warning of hazardous conditions in advance of its braking distance so that the train can take appropriate measures (e.g., apply the emergency brake and stop) prior to the hazardous condition.

Embodiments entail real time autonomous positioning and navigation of drone 20 ahead of monitored vehicle 22 by a braking distance 26 of the moving monitored vehicle 22. Drone 20 may include various sensors for data collection. For example, drone 20 may be equipped with a sensor system that includes long range radar 28 for detecting hazardous conditions at a relatively far distance 30 (e.g., 10-250 meters) and with short range radar 32 for detecting hazardous conditions at a relatively short distance 34 (e.g., 0.5 to 20 meters). Thus, long range radar 28 may be used for detection of an obstacle at a distance and short range radar 32 may be used for monitoring the railroad track paths and faults on railroad track 24. Drone 20 may additionally or alternatively be equipped with additional sensors including, for example, ultra-wide band (UWB) radar, photographic cameras, video cameras, infra-red cameras, multispectral cameras, lidar, sonar, and so forth.

Drone 20 thus travels ahead of monitored vehicle 22 (e.g., a train) by a leading distance 36. In some embodiments, leading distance 36 is no less than braking distance 26. In other embodiments, leading distance 36 is greater than braking distance 26 to account for the processing overhead needed for the detection and classification of a hazardous condition at drone 20, as well as to account for the time needed for transmission of the information from drone 20 to monitored vehicle 22. Drone 20 is configured to detect hazardous conditions ahead of drone 20 and use a wireless communication link 38 to notify monitored vehicle 22 of the hazardous condition so that monitored vehicle 22 can take appropriate corrective action (e.g., initiate braking).

In some embodiments, wireless communication link 38 may be established based on a dedicated short-range communications (DSRC) technology. DSRC is an open-source protocol for wireless communication that is intended for highly secure, high-speed wireless communication between vehicles and the infrastructure. Some functional attributes of DSRC are low latency, limited interference, and strong performance during adverse weather conditions. In terms of low latency, delays involved in opening and closing a wireless connection are very short, on the order of 0.02 seconds. In terms of limited interference, DSRC is very robust in the face of radio interference. Additionally, DSRC may enable a communication range of greater than 1.5 km to accommodate the large braking distances of the monitored vehicle (e.g., trains), while still having a short enough communication range to reduce the potential for interference from distant sources. DSRC technology implements IEEE 802.11p in the 5.9 GHz band, and is to be used for vehicle safety and other mobility applications. Although DSRC technology is mentioned herein for establishing wireless communication link 38, other suitable WLAN-based (wireless local area network) or cellular-based vehicular communication systems may be implemented.

Figure 2:
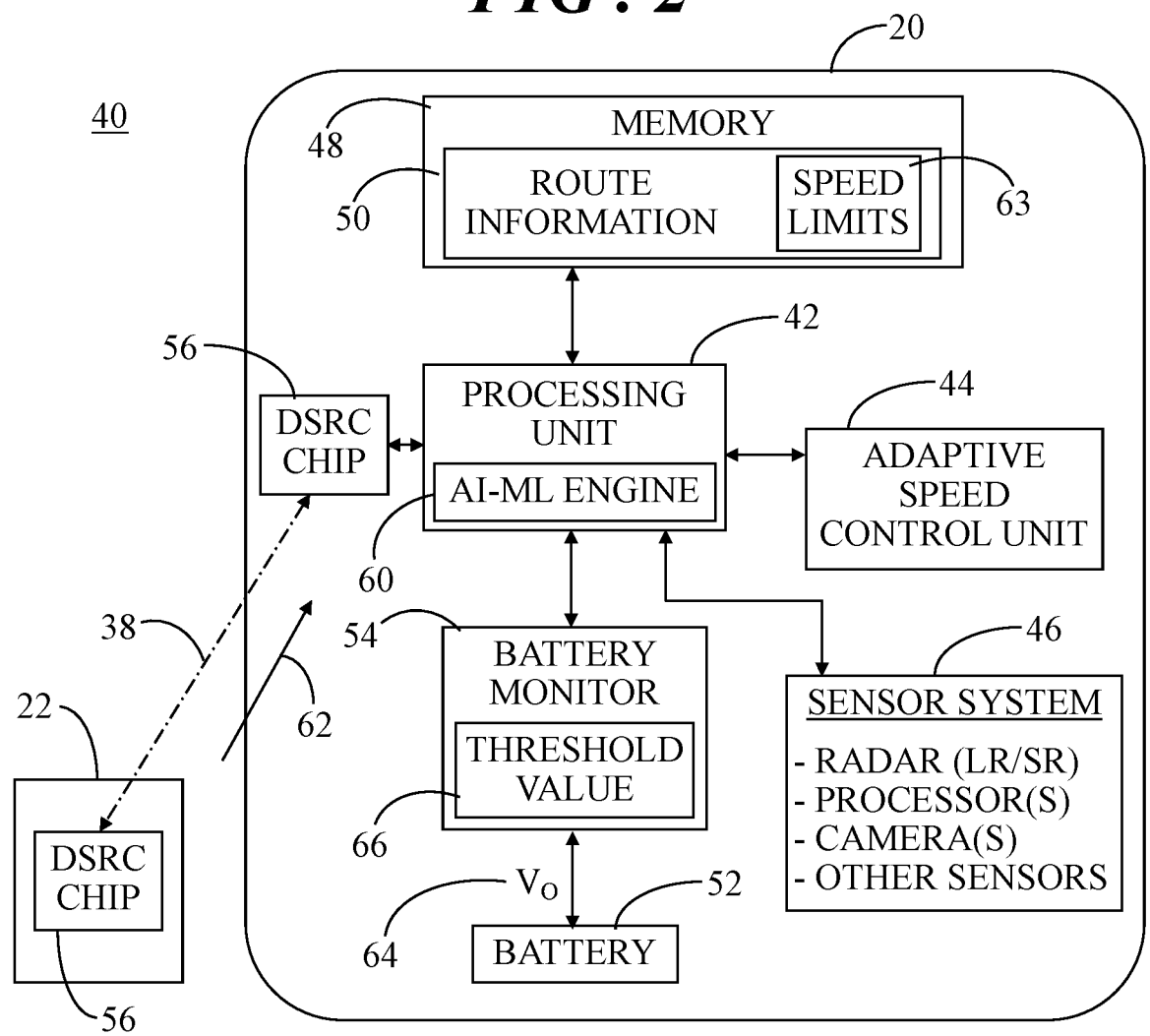
FIG. 2 shows a block diagram of a system in accordance with an embodiment.

Referring concurrently to FIGS. 1 and 2, FIG. 2 shows a block diagram of a system 40 in accordance with an embodiment. In some embodiments, system 40 includes an unmanned vehicle, e.g., drone 20, for monitoring a second vehicle (e.g., monitored vehicle 22) moving along a route (e.g., railroad track 24). In an example, drone 20 includes a processing unit 42, an adaptive speed control unit 44, a sensor system 46, a memory element 48 having predetermined route information 50 for route 25 stored therein, a battery 52, a battery monitor circuit 54, and a communication module 56 (e.g., a DSRC chip). One or more communication buses, such as a CAN bus, or signal lines may couple processing unit 42, adaptive speed control unit 44, sensor system 46, memory element 48, battery 52, battery monitor circuit 54, and communication module 56 (e.g., a DSRC chip). System 40 may additionally include a corresponding communication module 56 (e.g., a DSRC chip) residing on monitored vehicle 22 such that wireless communication link 38 can be continuously maintained between drone 20 and monitored vehicle 22.

Processing unit 42 may include a monitoring module 60 (e.g., an artificial intelligence (AI) and machine learning (ML) engine) configured to determine braking distance 26 for monitored vehicle in response to a current speed 62 of monitored vehicle 22. AI/ML techniques may be useful to simplify processing and thereby enable the lowest possible power profile for obstacle detection. In an example, trains typically travel on a predetermined route. If, for example, there is an overhead bridge, it can be masked out for obstacle detection, thereby saving on processing power. Additionally, a dry run may be performed on the entire route so that key attributes can be saved in memory element 48 as predetermined route information 50. At a subsequent time, the change between the dry run and actual movement along route 25 may be compared, again thereby significantly reducing the computational power requirements by taking advantage of object classification. AI/ML techniques may also be useful for determining a path trajectory if monitored vehicle 22 deviates from its predetermined route 25 (discussed below).

The terms "engine," "algorithm," "module," as used herein, refer to logic embodied in hardware or firmware, or to a collection of software instructions written in a programming language and executed by processing unit 42. Processing unit 42 may be a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. Processing unit 42 can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described below may be implemented in analog circuitry or mixed analog and digital circuitry.

Current speed 62 may be calculated by drone 20 or may otherwise be obtained by drone 20 via a communication link (e.g., wireless communication link 38) established between drone 20 and monitored vehicle 22. In some embodiments, processing unit 42, executing tracking algorithm may determine braking distance 26 based at least in part on current speed 62, an elevation variability (uphill, downhill, or level) of route 25, and a mass of monitored vehicle 22. Again, braking distance 26 characterizes a travel distance that monitored vehicle 22 will move from an initial location at which braking is initiated to a final location at which monitored vehicle 22 stops moving as represented by expression (1) above.

Processing unit 42, executing monitoring module 60, may be further configured to determine leading distance 36 for drone 20 based on the determined braking distance 26. As discussed above, leading distance 36 is no less than braking distance 26 and may be greater than braking distance 26 to account for the overhead needed for the processing and communicating operations.

In some embodiments, adaptive speed control unit 44 manages navigation control operations for drone 20. For example, adaptive speed control unit 44 is configured to adjust a guide speed and position of drone 20 by controlling operation of motors and actuators (not shown) of drone 20 such that drone 20 travels ahead of monitored vehicle 22 by at least leading distance 36. The motors may be used for rotation of propellers and the actuators may be used for navigation surface control such as ailerons, rudders, flaps, landing gear, and so forth. As will be discussed in significantly greater detail in connection with FIG. 4, processing unit 42 may be configured to determine another braking distance for monitored vehicle 22 in response to a change in current speed 62 of monitored vehicle 22 and determine an updated leading distance 36 based on the change in current speed. Accordingly, adaptive speed control unit 44 may adjust the guide speed and position of drone 20 such that drone 20 travels ahead of monitored vehicle 22 by at least the updated leading distance.

Sensor system 46 is configured to detect a hazardous condition along route 25 ahead of drone 20. Sensor system 46 may include any combination of a radar detection system (e.g., long range, short range, and UWB radar), processors, cameras, USB sensors, other real time location systems, and other sensing mechanisms for detecting hazardous conditions. Hazardous conditions include, but are not limited to, obstacles along route 25, overspeeding of monitored vehicle 22, faults in railroad track 24, deviation of monitored vehicle 22 from route 25, and so forth. Predetermined route information 50 stored in memory element 48 may include predefined waypoints for route 25, travel time between stops and for the entire route, duration of stops, allowable/expected speed limits along route 25, and the like. The allowable/expected speed limits along route 25 are represented by a block 63 embedded within predetermined route information 50. Allowable/expected speed limits 63 may be implemented as a database associated with, for example, the predefined waypoints for route 25. Route information 50 may be accessed by processing unit 42 to determine any deviation of monitored vehicle 22 from route 25 (e.g., human error, hijacking, and so forth), to identify overspeeding conditions along route 25, and so forth. Further, route information 50 may be accessed by processing unit 42 to optimize the speed of monitored vehicle 22 based upon route information 50 and environment conditions. Those skilled in the art will recognize that route information 50 and allowable/expected speed limits 63 may be organized in any suitable manner.

Battery 52 is configured to provide electrical energy to drone 20 to enable the processing capabilities and movement of drone 20. Battery monitor circuit 54 is configured to monitor a battery output voltage 64, $V_O$, and compare it with a threshold value 66. Some systems may include a second drone residing on monitored vehicle 22. As will be discussed in significantly greater details in connection with FIGS. 11-13, when battery output voltage 64 of drone 20 drops below threshold value 66, an automatic launch of the second drone may occur and the second drone (e.g., drone 152 in FIGS. 12 and 13) replaces drone 20. The drone (e.g., drone 20) with reduced power may thereafter navigate and land on monitored vehicle 22 for recharging.

Figure 3:
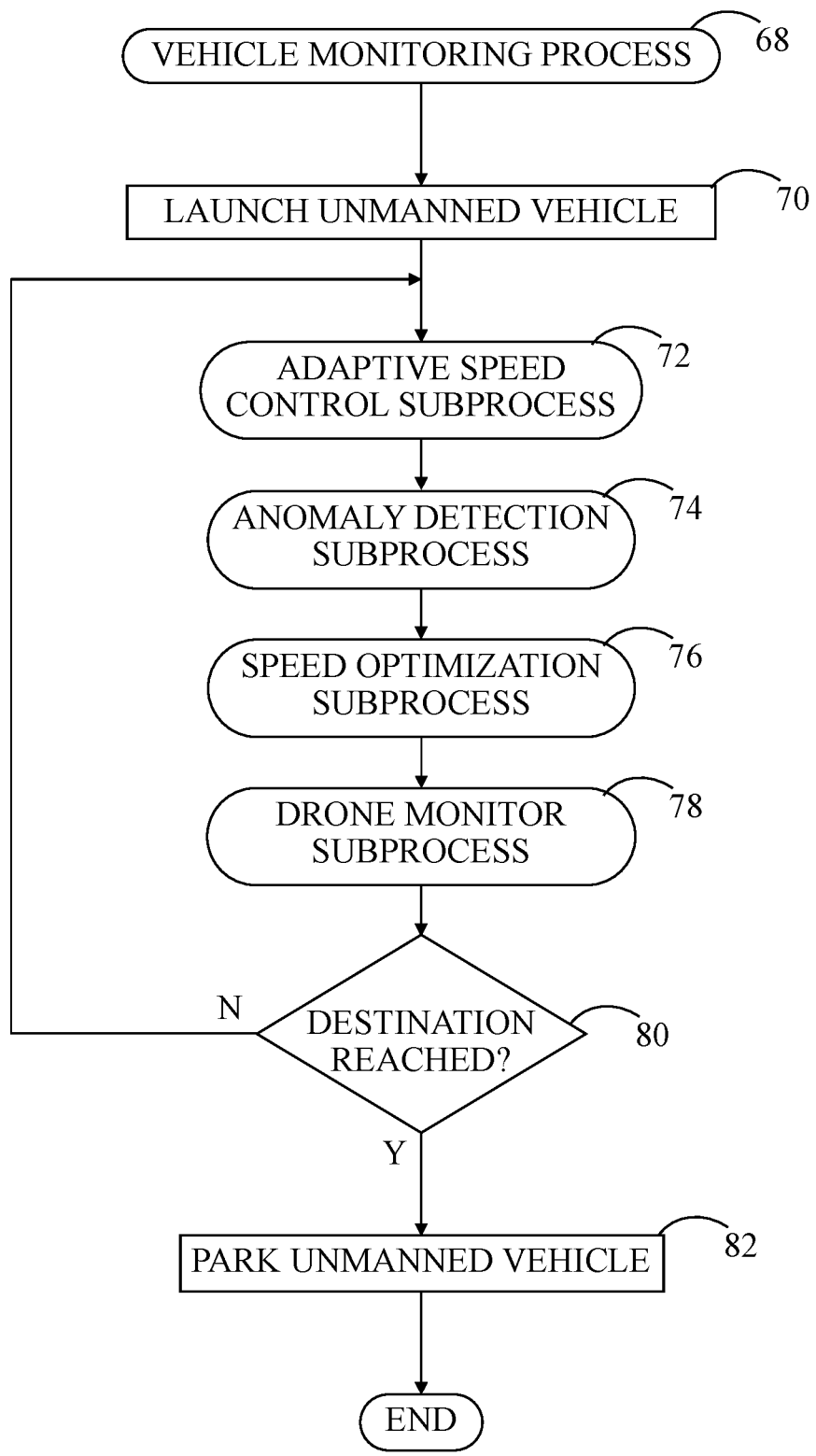
FIG. 3 shows a flowchart of a vehicle monitoring process performed by the unmanned vehicle.

Referring now to FIG. 3, FIG. 3 shows a flowchart of a vehicle monitoring process 68 performed by the unmanned vehicle (e.g., drone 20). Vehicle monitoring process 68 provides high level operational blocks and subprocesses associated with intelligently adapting the guide speed and position of drone 20 ahead of monitored vehicle 22 in real time, detecting hazardous conditions by sensor system 46 of drone 20, and notifying monitored vehicle 22 of any hazardous conditions so that monitored vehicle may take safe and convenient precautionary measures. Vehicle monitoring process 68 may be performed by drone 20, which may utilize processing unit 42 executing monitoring module 60. For convenience, reference should be made concurrently to FIGS. 1, 2, and 3 in connection with the ensuing description.

In accordance with an operational block 70 of vehicle monitoring process 68, the unmanned vehicle (e.g., drone 20) is launched. The launch of drone 20 may occur when monitored vehicle 22 begins moving. Drone 20 may be launched from a charging pad on monitored vehicle 22 or from a launch site near monitored vehicle 22. After drone 20 is launched, an adaptive speed control subprocess 72, an anomaly detection subprocess 74, a speed optimization process 76, and/or a drone monitor subprocess 78 may be performed.

In general, adaptive speed control subprocess is executed to determine a braking distance for monitored vehicle 22 in response to a current speed of monitored vehicle, determine a leading distance for drone 20 based on the braking distance, and adjust a guide speed and position of drone 20 such that drone 20 travels ahead of monitored vehicle 22 by at least the leading distance. Adaptive speed control subprocess 72 will be discussed in connection with the flowchart of FIG. 4. Anomaly detection subprocess 74 may be executed to detect a hazardous condition along route 25 ahead of drone 20 and notify monitored vehicle 22 of the hazardous condition via wireless communication link 38. Anomaly detection subprocess 74 will be discussed in connection with the flowcharts of FIGS. 5 and 9. Speed optimization subprocess 76 may be executed to enable real time adjustments of the speed of monitored vehicle to safely reach its destination at the scheduled time. Speed optimization subprocess 76 will be discussed in connection with the flowchart of FIG. 10. Drone monitor subprocess 78 may be executed to monitor battery output voltage 64 and/or monitor any other anomalies associated with drone 20, send a trigger signal to monitored vehicle 22 via wireless communication link 38 when an issue arises with drone 20 (e.g., insufficient remaining power, malfunction, etc.) and replace drone 20 with another drone in response to receipt of the trigger signal at monitored vehicle 22. Drone monitor subprocess 78 will be discussed in connection with the flowchart of FIG. 11.

Subprocesses 72, 74, 76, 78 are presented in vehicle monitoring process 68 in sequential order for simplicity. However, it will become apparent in the ensuing discussion, that subprocesses 72, 74, 76, 78 may be performed in any order. Alternatively, some or all of subprocesses 72, 74, 76, 78 may be performed in parallel for enhanced computational efficiency. Further, while adaptive speed control subprocess 72 may be performed during each execution of vehicle monitoring process 68, some or all of subprocesses 74, 76, 78 may or may not be executed in accordance with particular considerations such as the particular route for the monitored vehicle, duration of the journey of the monitored vehicle, criticality of the journey and/or vehicle, type of vehicle being monitored, and so forth.

At a query block 80, a determination is made as to whether monitored vehicle 22 has reached its destination. When monitored vehicle 22 has not yet reached its destination, process control loops back to continue the execution of adaptive speed control subprocess 72, anomaly detection subprocess 74, and/or drone monitor subprocess 78. Accordingly, drone 20 is capable of continuously adapting its guide speed in response to the current speed of monitored vehicle, detecting hazardous conditions ahead of drone 20, notifying monitored vehicle 22 of such hazardous conditions, and monitoring its remaining power such that drone 20 may be replaced by another drone (e.g., drone 152, FIG. 12) based on decreased remaining power.

When a determination is made at query block 80 that monitored vehicle 22 has reached its destination, the unmanned vehicle (e.g., drone 20) may be parked in accordance with an operational block 82 of vehicle monitoring process 68. Drone 20 may be parked on a charging pad residing on monitored vehicle 22 or on a landing site near monitored vehicle 22. Thereafter, vehicle monitoring process 68 ends.

Figure 4:
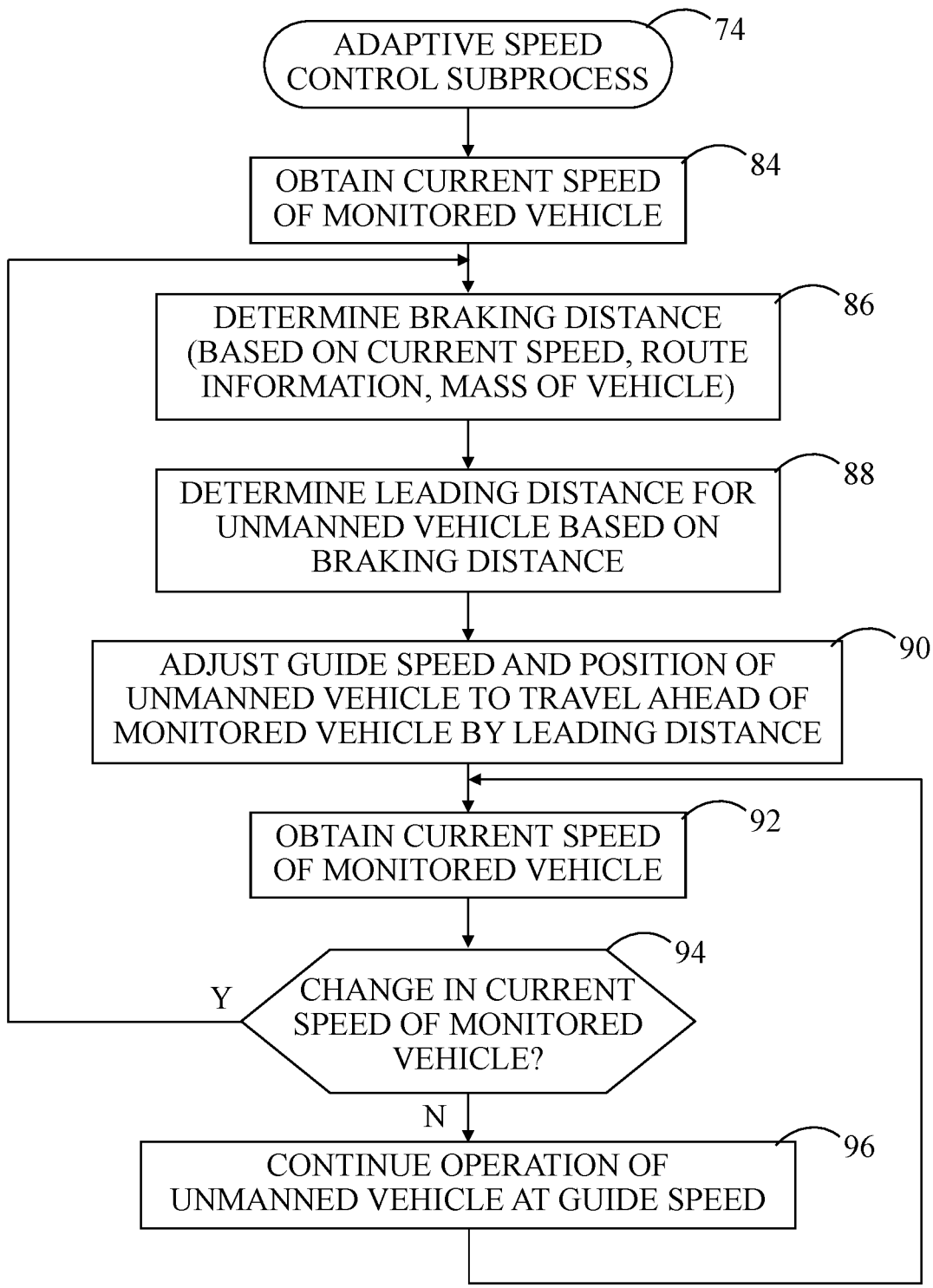
FIG. 4 shows a flowchart of an adaptive speed control subprocess of the vehicle monitoring process of FIG. 3.

FIG. 4 shows a flowchart of adaptive speed control subprocess 72 of vehicle monitoring process 68 (FIG. 3). Adaptive speed control subprocess 72 is performed by drone 20 to continuously enable drone 20 to adapt its guide speed and position in real time based on the varying speed of monitored vehicle so as to maintain a leading distance ahead of monitored vehicle 22. For convenience, reference should be made concurrently to FIGS. 1, 2, and 4 in connection with the following description.

At a block 84, drone 20 obtains current speed 62 of monitored vehicle 22. Current speed 62 may be obtained by a radio link between monitored vehicle and drone 20. Alternatively, current speed 62 of monitored vehicle 22 may be calculated by drone 20. At a block 86, drone 20 determines braking distance 26 for monitored vehicle 22 based on at least current speed 62 of monitored vehicle, predetermined route information for route 25 stored in memory element 48, and the mass of monitored vehicle 22. Drone 20 may also take into account an elevation variability (e.g., uphill, downhill, level) of route 25 and/or current environmental conditions (e.g., rain, snow, ice) to determine braking distance 26 for monitored vehicle 22.

At a block 88, drone 20 determines leading distance 36 for drone 20 based on the computed braking distance 26. As mentioned previously, leading distance 36 is no less than braking distance 26 in some embodiments. In other embodiments, leading distance 36 is greater than braking distance 26 to account for the overhead needed for the detection and classification of a hazardous condition at drone 20, as well as to account for the time needed for transmission of the information from drone 20 to monitored vehicle 22.

At a block 90, drone 20 adjusts its guide speed and position so that drone travels ahead of monitored vehicle 22 by leading distance 36. For example, drone 20 may speed up or slow down to position itself ahead of monitored vehicle 22 by leading distance 36. Thereafter, the guide speed of drone 20 may be approximately equivalent to monitored vehicle 22 so that it remains traveling ahead of monitored vehicle 22 by leading distance 36.

At a block 92, drone 20 again obtains a current speed of monitored vehicle 22. Block 92 may be performed at some periodic interval to determine whether the current speed of monitored vehicle 22 has changed (e.g., increased or decreased). A query block 94 is performed in response to obtaining the current speed of monitored vehicle. At query block 94, a determination is made as to whether the current speed of monitored vehicle 22 has changed (e.g., increased or decreased) at another instant in time. When a change in the current speed of monitored vehicle 22 is determined at this later instant in time, process control loops back to block 86 to determine an updated (e.g., second) braking distance for monitored vehicle 22 in response to the changed (e.g., a second) current speed of monitored vehicle 22, block 88 to determine an updated (e.g., a second) leading distance for drone 20 based on the updated braking distance, and to block 90 to adjust the guide speed and position of drone 20 such that drone 20 continues to travel ahead of monitored vehicle 22 by at least the updated leading distance.

When a determination is made at query block 94 that current speed 62 of monitored vehicle 22 has not changed, process control continues with a block 96. At block 96, the operation of drone 20 occurs at the current guide speed. In other words, drone 20 does not change its speed because the speed of monitored vehicle has not changed. Following block 96, process control loops back to block 92 to continue monitoring the speed of monitored vehicle 22 and to enable drone 20 to autonomously navigate at a leading distance ahead of monitored vehicle 22. The execution of adaptive speed control subprocess 72 may continue until a determination is made at query block 80 (FIG. 3) of vehicle monitoring process (FIG. 3) that monitored vehicle 20 has reached is destination.

Figure 5:
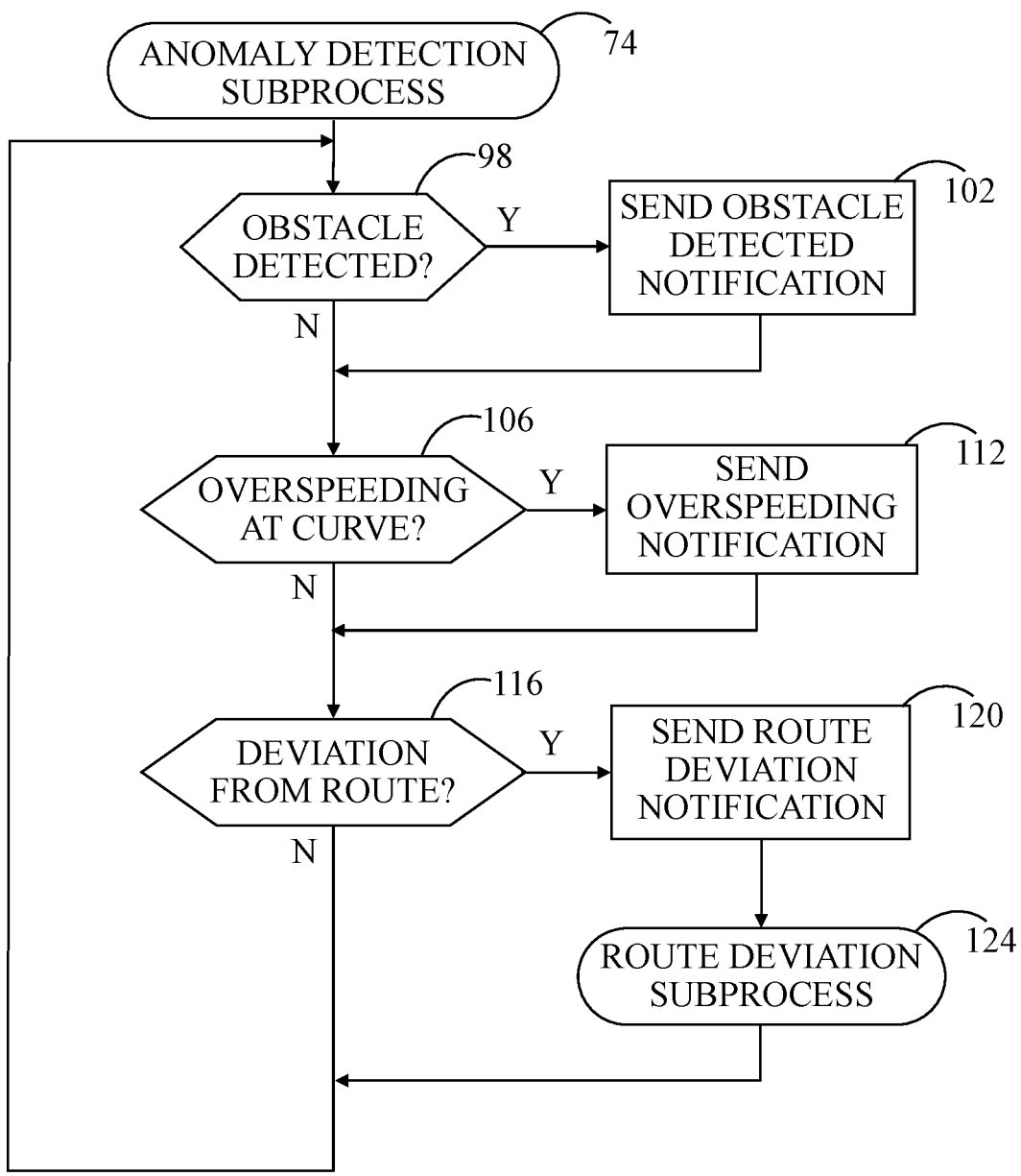
FIG. 5 shows a flowchart of an anomaly detection subprocess of the vehicle monitoring process of FIG. 3.

FIG. 5 shows a flowchart of anomaly detection subprocess 74 of vehicle monitoring process 68 (FIG. 3). Anomaly detection subprocess 74 is performed by drone 20 to continuously enable drone 20 to detect anomalies (e.g., hazardous conditions) and to notify monitored vehicle 22 of the anomaly. It will be readily observed that anomaly detection subprocess 74 includes a number of query blocks arranged in serial order for identifying a number of anomalies (e.g., hazardous conditions). Although the query blocks and resulting operations are described in serial order, those skilled in the art will recognize that execution of the query blocks and their corresponding operational blocks may be performed in any order. Alternatively, some or all of the query blocks and their corresponding operational blocks may be may be executed in parallel for enhanced computational efficiency. For convenience, reference should be made concurrently to FIGS. 1, 2, and 5 in connection with the ensuing description.

At a query block 98, a determination is made as to whether drone 20 detects a hazardous condition in the form of an obstacle on route 25 ahead of drone 20. Obstacles may be detected by sensor system 46, which may include a radar detection system that includes both long range and short range radar, photographic cameras, video cameras, infra-red cameras, multispectral cameras, lidar, sonar, and so forth. In an example in which monitored vehicle 22 is a train moving on railroad track 24, obstacles that may be detected by long range radar can include, but are not limited to, animals, people, or vehicles on railroad track 24, rocks or dirt from landslides present on railroad track 24, a moving vehicle (e.g., train) approaching monitored vehicle on the same railroad track 24. Additionally, short range radar may detect obstacles in the form of, for example, track faults.

Figure 6:
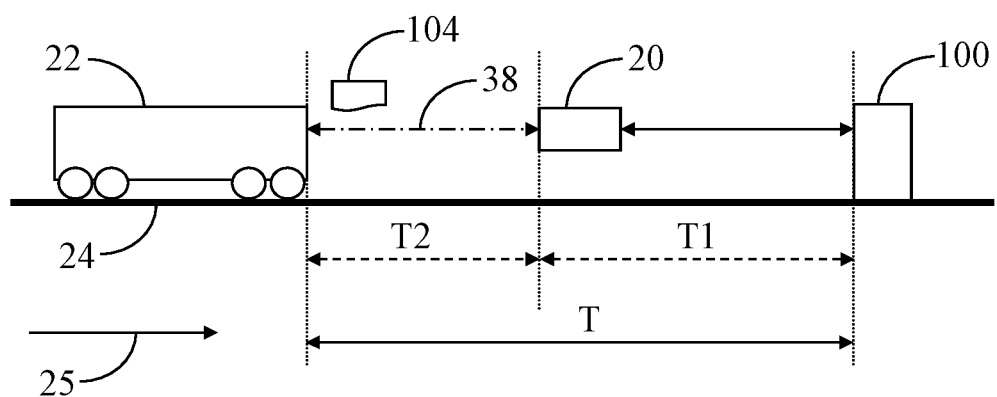
FIG. 6 shows an example of the unmanned vehicle detecting a hazardous condition in the form of an obstacle along the route in accordance with the anomaly detection subprocess of FIG. 5.

Referring concurrently to FIGS. 5 and 6, FIG. 6 shows an example of drone 20 detecting a hazardous condition in the form of an obstacle 100 along route 25 in accordance with anomaly detection subprocess 74. In this example, drone 20 detects obstacle 100 through, for instance, radar in which a signal is transmitted and a reflected signal is received at drone 20, the reflected signal indicated the presence of obstacle 100. As shown in FIG. 6, "T1" represents the amount of time for transmitting the radar signal, receiving the reflected signal, and processing the received reflected signal at drone 20 and "T2" represents the amount of time for transmitting packets via wireless communication link 38. The total time "T" represents "T1" summed with "T2." The time it takes for a vehicle to stop depends at least in part on its braking distance 26. Accordingly, the total time "T" should be greater than the time allotted for monitored vehicle 22 to come to a complete stop.

When a determination is made at query block 98 that obstacle 100 is detected, subprocess 74 continues with an operational block 102. At block 102, a notification 104 (e.g., one or more packets of data) is sent to monitored vehicle 22 via wireless communication link 38. Thereafter, monitored vehicle 22, which may be under the command of a driver of monitored vehicle 22 or which may be autonomous, may take corrective action. The corrective action may be, but is not limited to, application of the emergency brake or altering course to avoid the obstacle (when monitored vehicle 22 is not constrained to a track).

Following either of blocks 98 or 102, anomaly detection subprocess 74 may continue with a query block 106. At query block 106, a determination is made as to whether drone 20 detects a hazardous condition in the form of an overspeed condition (e.g., monitored vehicle 22 may be moving at current speed that is greater than allowable speed 63, FIG. 2, for monitored vehicle 22 at a future location). That is, a determination is made at query block 106 as to whether monitored vehicle 22 may be in an overspeed condition as it approaches a curve.

Figure 7:
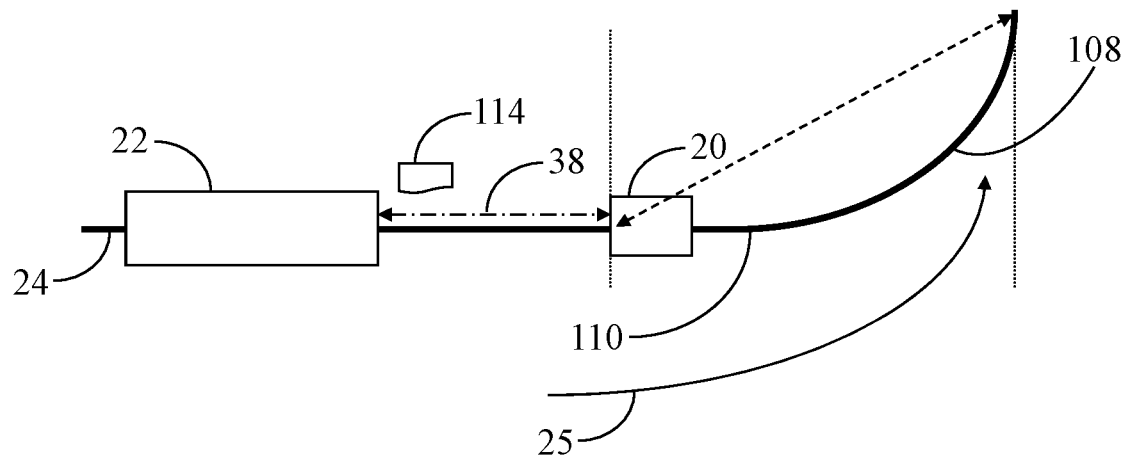
FIG. 7 shows an example of the unmanned vehicle detecting a hazardous condition in the form of excess speed at a curve along the route in accordance with the anomaly detection subprocess of FIG. 5.

Referring concurrently to FIGS. 5 and 7, FIG. 7 shows an example of drone 20 detecting a hazardous condition in the form of excess speed at a curve 108 in railroad track 24 along route 25 in accordance with anomaly detection subprocess 74. As monitored vehicle 22 approaches curve 108, drone 20 may provide a maximum allowable speed 63, FIG. 2, at which monitored vehicle 22 can safely traverse through curve 108. In some examples, given the current speed of monitored vehicle 22, a known location of drone 20, a future location 110 of monitored vehicle 22 at the onset of curve 108 along route 25, predetermined route information 50 stored in memory element 48, and possibly weather conditions, drone 20 may calculate a predicted angular tilt of monitored vehicle 22 in curve 108 and estimate an allowable speed for monitored vehicle 22 at future location 110 of monitored vehicle.

When a determination is made at query block 106 that monitored vehicle 22 may be in an overspeed condition as it approaches curve 108 (e.g., the current speed of monitored vehicle 22 is greater than the allowable speed for monitored vehicle 22), subprocess 74 continues with an operational block 112. At block 112, a notification 114 (e.g., one or more packets of data) is sent to monitored vehicle 22 via wireless communication link 38. Thereafter, monitored vehicle 22, which may be under the command of a driver of monitored vehicle 22 or which may be autonomous, may take corrective action. The corrective action may be to slow monitored vehicle 22 down to the allowable speed as predicted by drone 20.

Following either of blocks 106 or 112, anomaly detection subprocess 74 may continue with a query block 116. At query block 116, a determination is made as to whether drone 20 detects a hazardous condition in the form of deviation of monitored vehicle 22 from route 25. That is, a determination is made at query block 116 as to whether monitored vehicle 22 is being diverted to another railroad track or is otherwise altering its course due to, for example, human error or a hijacking.

Figure 8:
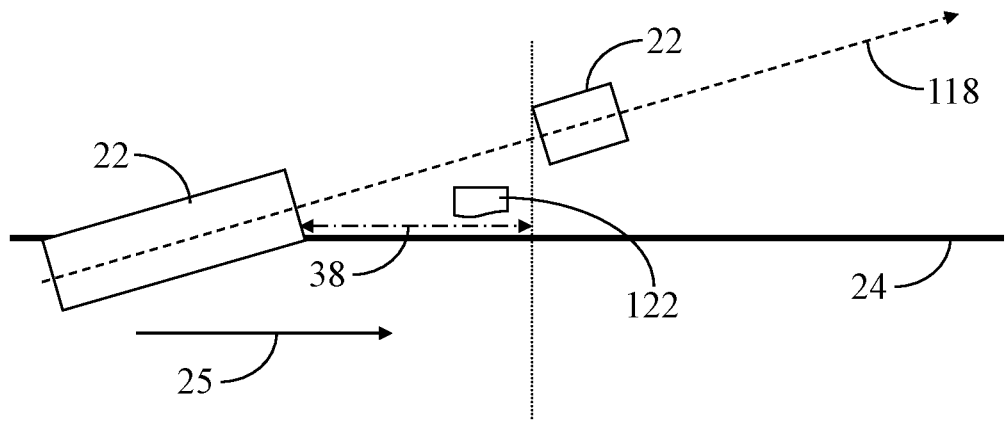
FIG. 8 shows an example of the unmanned vehicle detecting a hazardous condition in the form of a deviation from the route in accordance with the anomaly detection subprocess of FIG. 5.

Referring to FIGS. 5 and 8, FIG. 8 shows an example of drone 20 detecting a hazardous condition in the form of a deviation from route 25 in accordance with anomaly detection subprocess 74. Route information 50 may be accessed by processing unit 42 of drone 20 to determine any deviation of monitored vehicle 22 from the predetermined route 25. This determination can be made by drone 20 determining a trajectory path 118 for monitored vehicle 22, in which trajectory path 118 differs from route 25.

When a determination is made at query block 116 that the motion of monitored vehicle 22 may be deviating from route 25, subprocess 74 continues with an operational block 120. At block 120, a notification 122 (e.g., one or more packets of data) is sent to monitored vehicle 22 via wireless communication link 38. Notification 122 may additionally include information redirecting monitored vehicle 22 from trajectory path 118 back to route 25. Thereafter, monitored vehicle 22, typically under the command of a driver of monitored vehicle 22, may take corrective action. The corrective action may be to return to route 25 (if possible), apply the emergency brake, contact emergency officials, or any other suitable corrective action. In some embodiments, a route deviation subprocess 124 may be executed by drone 20 in response to the detected deviation of monitored vehicle 22 from route 25.

Figure 9:
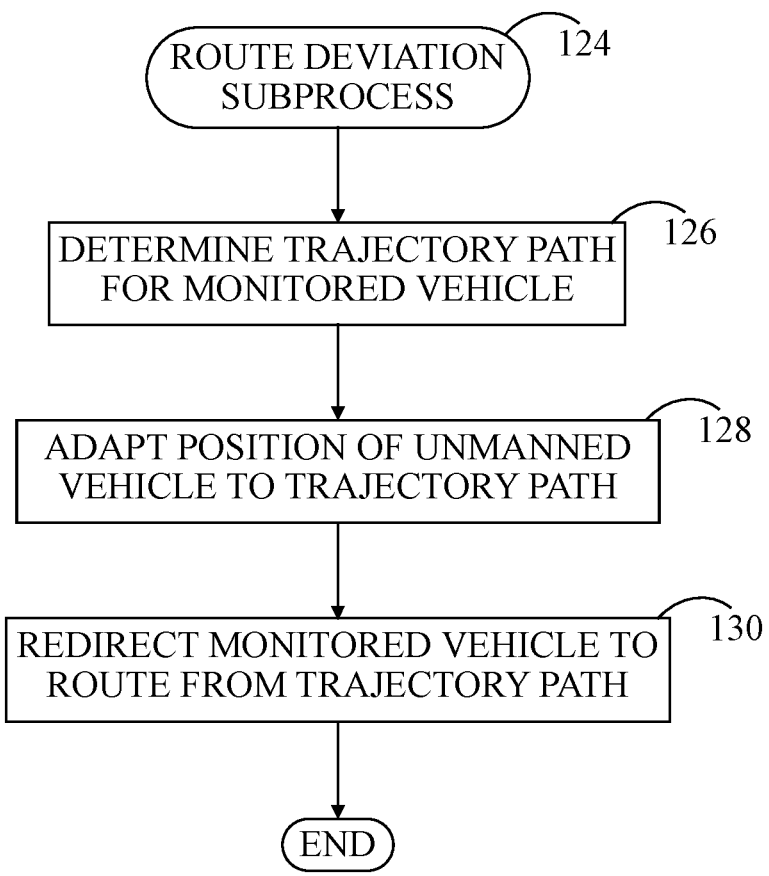
FIG. 9 shows a flowchart of a route deviation subprocess of the anomaly detection subprocess of FIG. 5 performed when a deviation from the route is detected.

Referring now to FIGS. 5, 8, and 9, FIG. 9 shows a flowchart of route deviation subprocess 124 of anomaly detection subprocess 74 that may be performed when a deviation from route 25 is detected. At an operational block 126, drone 20 determines the deviated path, e.g., a trajectory path 118, for monitored vehicle 22 based at least in part on predetermined route information 50 (FIG. 2) stored in memory element 48 (FIG. 2). At an operational block 128, drone 20 adapts its position such that drone 20 travels ahead of monitored vehicle 22 along the deviated path trajectory path 118. At an operational block 130, drone 20 may redirect monitored vehicle 22 back to route 25 from deviated trajectory path 118 via notification 122. Thus, drone 20 may travel on the deviated trajectory path 118, learn about the deviation, and may instruct monitored vehicle 22 as to how to return to route 25 (e.g., travel in reverse direction for a certain distance).

Thereafter, an iteration of route deviation subprocess 124 ends. Of course, route deviation subprocess 124 may be periodically repeated so that drone 20 continues traveling along trajectory path 118 ahead of monitored vehicle 22. Referring back to FIGS. 1, 2, and 5, following either of block 116 or route deviation process 124, process control may loop back to query block 98 and execution of anomaly detection process 74 may continue until a determination is made at query block 80 (FIG. 3) of vehicle monitoring process (FIG. 3) that monitored vehicle 20 has reached is destination.

Figure 10:
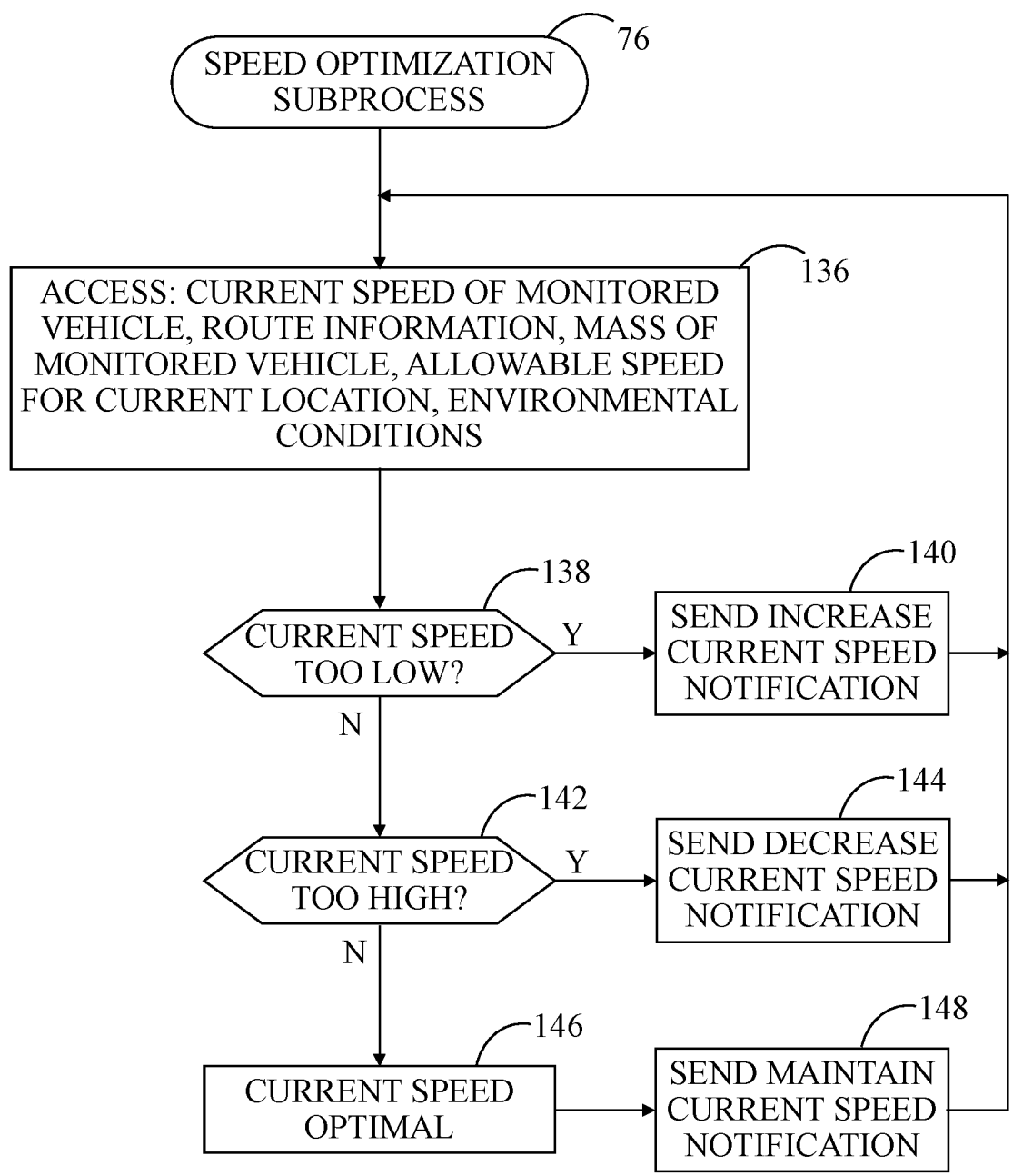
FIG. 10 shows a flowchart of a speed optimization subprocess of the vehicle monitoring process of FIG. 3.

FIG. 10 shows a flowchart of speed optimization subprocess 76 of vehicle monitoring process 68 (FIG. 3). In some embodiments, drone 20 may be utilized to facilitate speed optimization of monitored vehicle 22. That is, monitoring module 60, executed by processing unit 42, may be enabled to facilitate speed optimization of monitored vehicle 22 when there are currently no hazardous conditions along route 25 of monitored vehicle 22. For convenience, reference should be made concurrently to FIGS. 1, 2, and 10 in connection with the ensuing description.

At an operational block 136, drone 20 accesses at least current speed 62 of monitored vehicle 22, the mass of monitored vehicle 22 which may be stored in memory element 48, predetermined route information 50 stored in memory element 48, allowable speed 63 for the current location of drone 20, and possibly environmental conditions. At a query block 138, drone 20 determines whether current speed 62 of monitored vehicle 22 is too low relative to a safe allowable speed 63 for the particular location or stretch of route 25. When current speed 62 is too low, an operational block 140 may be performed. At operational block 140, drone 20 may send a notification to monitored vehicle 22 suggesting that the speed of monitored vehicle 22 can be increased to a particular safe allowable speed 63. Upon receipt of the increase speed notification, the speed of monitored vehicle 22, under the command of a driver of monitored vehicle 22 or autonomous, may be increased to the safe allowable speed.

When a determination is made at query block 138 that current speed 62 of monitored vehicle 22 is not too low, process control continues with a query block 142. At query block 142, drone 20 determines whether current speed 62 of monitored vehicle 22 is too high relative to a safe allowable speed 63 for the particular location or stretch of route 25. When current speed 62 is too high, an operational block 144 may be performed. At operational block 144, drone 20 may send a notification to monitored vehicle 22 suggesting that the speed of monitored vehicle 22 should be decreased to a particular safe allowable speed 63. Upon receipt of the decrease speed notification, the speed of monitored vehicle 22, typically under the command of a driver of monitored vehicle 22, may be decreased to the safe allowable speed.

When a determination is made at query block 138 that current speed 62 of monitored vehicle 22 is not too low and a determination is made at query block 142 that current speed 62 of monitored vehicle 22 is not too high, process control continues with a block 146. At block 146, drone 20 concludes that the current speed of monitored vehicle 22 is optimal for the particular location or stretch of route 25. When current speed 62 is optimal at block 146, an operational block 148 may be performed. At operational block 148, drone 20 may send a notification to monitored vehicle 22 suggesting that the speed of monitored vehicle 22 be maintained. That is, the current speed of monitored vehicle should remain unchanged. Upon receipt of the maintain current speed notification, the speed of monitored vehicle 22, typically under the command of a driver of monitored vehicle 22, may remain unchanged. Following any of increase current notification block 140, decrease current speed notification block 144, and maintain current speed notification block 148, process control may loop back to operational block 136 to continue assessment of the current speed of monitored vehicle 22 and suggest changes to the speed of the moving monitored vehicle as needed. The execution of speed optimization subprocess 76 may continue until a determination is made at query block 80 (FIG. 3) of vehicle monitoring process (FIG. 3) that monitored vehicle 20 has reached is destination.

Speed optimization subprocess 76 can be performed to recover from unscheduled stops, delays, and/or bad weather conditions during the journey of monitored vehicle 22 while considering constraints regarding maximum allowable speed limit(s) along route 25. Additionally, or alternatively, speed optimization subprocess 76 may be performed to aid in fuel efficiency by increasing the mileage (e.g., the ratio of distance traveled to the amount of fuel utilized) for monitored vehicle 22. Speed optimization subprocess 76 may suggest that the speed of monitored vehicle 22 can be increased based on safe zones (e.g., no hazardous conditions such as obstacles, curves, deviations from the route, and so forth) and to maintain speeds to reach a destination at a scheduled time. Speed optimization subprocess 76 may additionally keep record of the time history of stops of monitored vehicle 22 as well as durations at each of the stops for enabling data mining. Such information may be useful for optimizing journey duration of monitored vehicle 22.

Figure 11:
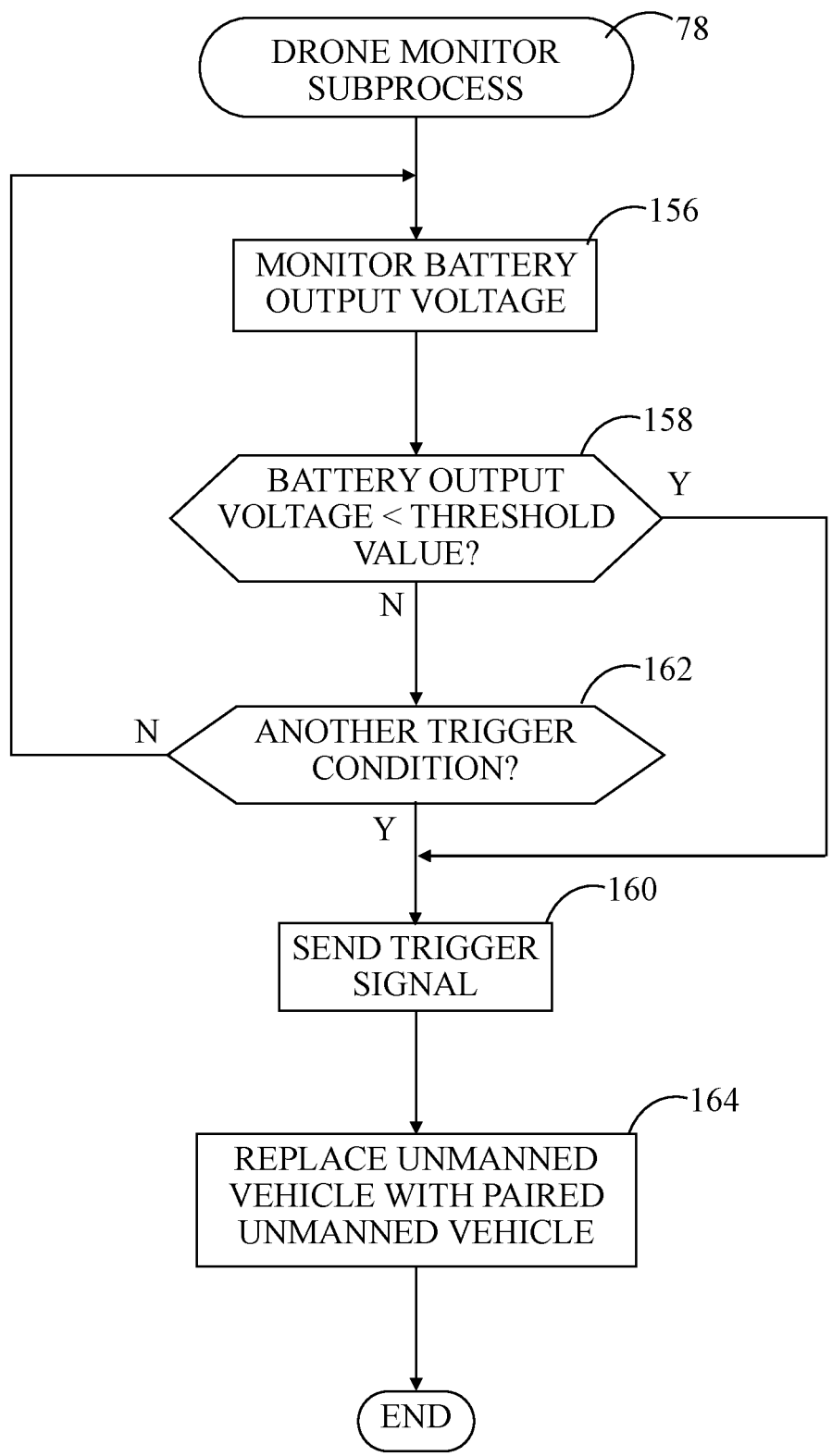
FIG. 11 shows a flowchart of a drone monitor subprocess of the vehicle monitoring process of FIG. 3.
Figure 12:
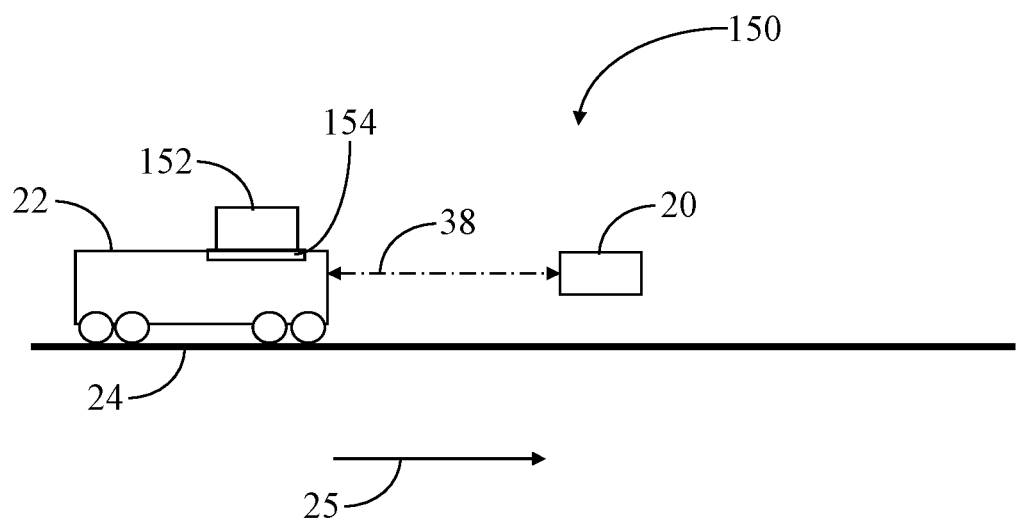
FIG. 12 shows an example of a system that includes a pair of unmanned vehicles capable of interacting with the vehicle to be monitored.

Referring to FIGS. 11 and 12, FIG. 11 shows a flowchart of a drone monitor subprocess 68 of vehicle monitoring process 68 (FIG. 3) and FIG. 12 shows an example of a system 150 that includes a pair of unmanned vehicles capable of interacting with the vehicle to be monitored. In some situations, the capacity of battery 52 (FIG. 2) may be insufficient for providing power to drone 20 for an entire duration of the journey of monitored vehicle 22. Accordingly, some systems (e.g., system 150) may include paired drones. In this example, system 150 includes drone 20 (a first drone) traveling ahead of monitored vehicle 22 and a second drone 152 residing on a charging pad 154 of monitored vehicle 22.

Second drone 152 may include the same components, systems, software, and processing engine as first drone 20. Hence, the block diagram of drone 20 shown in FIG. 2 applies equivalently to second drone 152. For purposes of the following description, first drone 20 is the leading drone traveling ahead of monitored vehicle 22 and second drone 152 resides on monitored vehicle. However, the positions of the paired drones 20, 152 may be reversed. For convenience, reference should be made concurrently to FIGS. 2, 11, and 12 in connection with the ensuing discussion.

In general, when battery output voltage 64 of battery 52 for first drone 20 (navigating ahead of monitored vehicle 22) drops below threshold value 66, first drone 20 may be replaced with second drone 152. Other conditions that may trigger replacement of first drone 20 with second drone 152 may include, but are not limited to, abnormalities/malfunctions of sensor system 46 of the leading drone (e.g., first drone 20), communication loss between the leading drone 20 and the monitored vehicle (e.g., losing wireless communication link 38, damage to or crash land of the leading drone), protocol violation for security requests (e.g., violation in the exchange of packed information sequence or any communication abnormalities between the leading drone and the monitored vehicle), or manual request. In general, the inclusion of second drone 152 in system 150 and execution of drone monitor subprocess 68 can enable autonomous launch and landing of the drones 20, 152 for any of a number of trigger conditions (e.g., low battery, drone malfunction, protocol violation, communication abnormalities, and so forth).

At an operational block 156 of drone monitor subprocess 78, battery output voltage 64 of battery 52 is monitored via battery monitor circuit 54 of drone 20. At a query block 158, a determination is made as to whether battery output voltage 64 is less than threshold value 66. When battery output voltage 64 is less than threshold value 66, process control proceeds to an operational block 160 at which a trigger signal is sent to monitored vehicle 22. When battery output voltage 64 is not less than threshold value 66, drone monitor subprocess 78 continues with a query block 162.

At query block 162, a determination is made as to whether another trigger condition is detected, such as those mentioned above. Such a trigger condition may be detected by monitored vehicle 22, first drone 20, and/or second drone 152. When a trigger condition is detected, process control again proceeds to operational block 160 at which the trigger signal is sent to monitored vehicle 22. In response to the trigger signal, an operational block 164 is performed to replace the unmanned vehicle (e.g., first drone 20) traveling ahead of monitored vehicle 22 with the second paired unmanned vehicle (e.g., second drone 152). Thereafter, drone monitor subprocess 78 may end. However, after second drone 152 becomes the leading drone traveling ahead of monitored vehicle 22, processing unit 42 of second drone 152 may execute vehicle monitoring process 68 to continue monitoring the monitored vehicle 22.

Figure 13:
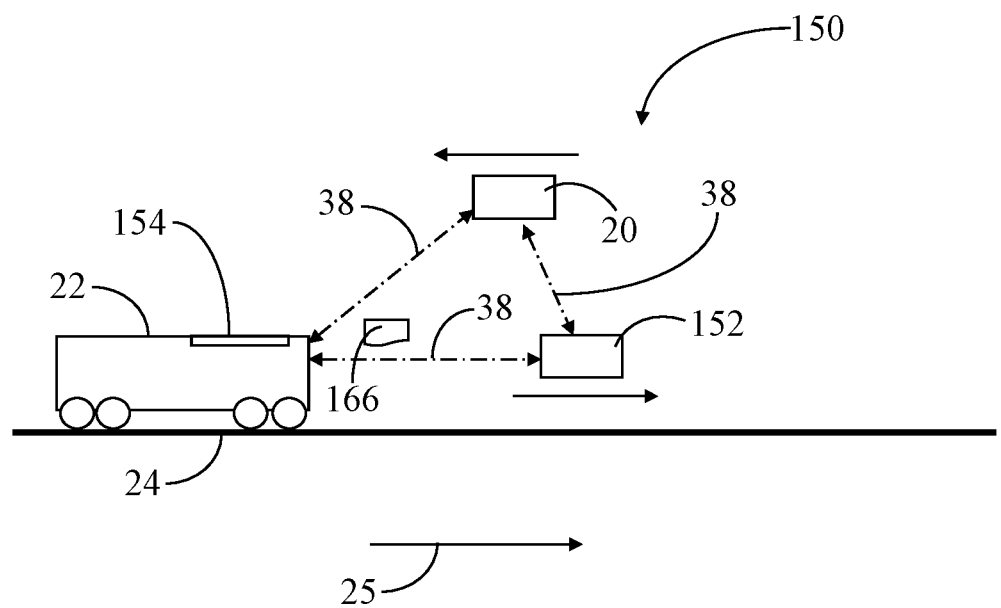
FIG. 13 shows an example of the system of FIG. 12 in which a leading unmanned vehicle is being replaced by another unmanned vehicle in response to the execution of the drone monitor subprocess of FIG. 11.

FIG. 13 shows an example of system 150 (FIG. 12) in which a leading unmanned vehicle is being replaced by another unmanned vehicle in response to the execution of the drone monitor subprocess (FIG. 11). In this example, first drone 20 is being replaced by second drone 152, and first drone 20 is returning to charging pad 154 on monitored vehicle 22. Thus, a leftward directed arrow above the block representing first drone 20 indicates its direction of travel toward charging pad 154 on monitored vehicle 22 and a rightward directed arrow below the block representing second drone 152 indicates its direction of travel into a position ahead of monitored vehicle. Of course, in the instance that first drone 20 has malfunctioned, first drone 20 may not actually return to monitored vehicle 22.

In some embodiments, second drone 152 is aware of the profile status for first drone 20 (e.g., speed, position, current functional status, and any other information second drone 152 may need to replace first drone 20). Second drone 152 may be coupled to wireless communication link 38 between first drone 20 and monitored vehicle 22. Second drone 152 is autonomously launched in response to a trigger signal 166 communicated over wireless communication link 38, for any of the aforementioned trigger conditions or reduced power profile. The status of the launch of second drone 152 may be communicated to first drone 20 and to monitored vehicle 22 until second drone 152 takes over the position of first drone 20.

In an example, a handshake (e.g., an automated process of negotiation) between first and second drones 20, 152 and monitored vehicle 22 may entail a) sharing wireless communication link 38 between first and second drones 20, 152, and monitored vehicle, b) first and second drones 20, 152 and monitored vehicle 22 are informed about the profile status (e.g., position, speed, and so forth) of one another, c) upon second drone 152 taking the position at braking distance 26, second drone 152 establishes a handshake and a radio link, d) after a successful handshake, second drone 152 becomes the current leading drone, and e) first drone 20 adapts the appropriate speed and position to land at a suitable location on monitored vehicle 22.

In order to enable precise autonomous launching of second drone 152 from and autonomous landing of first drone 20 on the moving monitored vehicle 22, ultrawide band (UWB) technology and/or radar may be implemented. Although UWB is mentioned herein, alternative embodiments may implement any other suitable real time positioning system (e.g., BLE5.x, Lynq, and so forth). For launching, communication to second drone 152 entails the current speed of the moving monitored vehicle 22 and external forces (e.g., wind, etc.). Controllers, such as PID (proportional-integral-derivative) controllers in second drone 152 adapt to the initial speed as calculated based on current speed of the moving monitored vehicle 22 and external forces. After second drone 152 establishes the current speed of the moving monitored vehicle 22, the drone's locks (e.g., magnetic links/couplings) are released from monitored vehicle 22. Thereafter, vertical positioning of the PID controllers begins for vertical or angular ascent of second drone 152 at speed.

For landing, the speed of first drone 20 is reduced step-by-step. Upon nearing the vicinity of a UWB programmed range, UWB sequences are enabled to establish an UWB link. After the establishment of the UWB link, accurate landing zone and positions can be calculated. The PID controllers of first drone 20 now adapt their parameters based on the UWB processed information. An angle of elevation controls the vertical motors of first drone 20 so that the angle of elevation and vertical position of first drone 20 is reduced step-by-step in incremental steps. The horizontal speed of first drone 20 may be maintained until the angle of elevation is locked to the accuracy of the landing platform on monitored vehicle 22. A magnetic link or a coupling effect may be utilized as feedback to indicate the successful acknowledgement of landing so the PID controllers of first drone 20 can be turned off. Thereafter, a battery recharging sequence may be initiated for first drone. Again, although UWB is mentioned herein, alternative embodiments may implement any other suitable real time positioning system (e.g., BLE5.x, Lynq, and so forth).

Thus, execution of the various processes described herein enable autonomous real time positioning of an unmanned vehicle ahead of vehicle to be monitored, detection of hazardous conditions, notification of the hazardous conditions to the monitored vehicle, speed optimization, and monitoring the battery level and functionality of the unmanned vehicle. It should be understood that certain ones of the process blocks depicted in FIGS. 3-5, and 9-11 may be performed in parallel with each other or with performing other processes. In addition, the particular ordering of the process blocks depicted in FIGS. 3-5, and 9-11 may be modified, while achieving substantially the same result. Accordingly, such modifications are intended to be included within the scope of the inventive subject matter.

Embodiments described herein entail systems and methodology for real time autonomous positioning and navigation of an unmanned vehicle ahead of a monitored moving vehicle for detecting of hazardous conditions. More particularly, the system and methodology enable real time positioning and speed control of the unmanned vehicle such that the unmanned vehicle travels ahead of the monitored vehicle by at least a guide distance corresponding to a safe braking distance of the monitored moving vehicle. The unmanned vehicle includes a sensor system (e.g., long range and short range radar) for detecting hazardous conditions along the route taken by the monitored vehicle and for notifying the monitored vehicle in advance of its safe braking distance so that the monitored vehicle can take appropriate corrective actions. In some embodiments, the unmanned vehicle has predetermined route information stored in it to ensure that the monitored vehicle is traveling on the route assigned to it. In some embodiments, the unmanned vehicle can perform real time calculations of the optimum speed for the monitored vehicle by using preloaded route information and real time environmental conditions. In some embodiments, the system may include paired unmanned vehicles in which one unmanned vehicle travels ahead of the monitored vehicle and the other unmanned vehicle resides at a charging pad on the monitored vehicle. Accordingly, the unmanned vehicles may exchange their positions based on the power profiles and/or functionality of the unmanned vehicles.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A system comprising:
  an unmanned vehicle configured to monitor a second vehicle moving along a route, the unmanned vehicle comprising:
    a communication module configured to enable a wireless communication link between the unmanned vehicle and the second vehicle for notifying the second vehicle of a hazardous condition;
    a speed control unit in communication with the processing unit and configured to adjust a guide speed and a position of the unmanned vehicle such that the unmanned vehicle travels ahead of the second vehicle by at least a leading distance;
    a sensor system configured to detect the hazardous condition along the route ahead of the unmanned vehicle; and
    a processing unit configured to:
      determine a braking distance for the second vehicle in response to a current speed of the second vehicle, wherein the braking distance characterizes a travel distance that the second vehicle will move from an initial location at which braking is initiated to a final location at which the second vehicle stops moving; and determine the leading distance for the unmanned vehicle based on the braking distance, wherein the leading distance is greater than the braking distance by an additional travel distance of the vehicle determined by a processing overhead time needed for the processing unit to detect and classify the hazardous condition and a notification overhead time needed to notify the second vehicle of the hazardous condition via the wireless communication link.

2. The system of claim 1 wherein the processing unit is further configured to determine the braking distance based on at least the current speed, an elevation variability of the route, and a mass of the second vehicle.

3. The system of claim 1 wherein the current speed is a first current speed, the braking distance is a first braking distance, the leading distance is a first leading distance, and wherein:

the processing unit is further configured to:
determine a second braking distance for the second vehicle in response to a second current speed of the second vehicle, the second current speed differing from the first current speed; and
determine a second leading distance for the unmanned vehicle based on the second braking distance; and
the speed control unit is further configured to adjust the guide speed and position of the unmanned vehicle such that the unmanned travels ahead of the second vehicle by at least the second leading distance.

4. The system of claim 1 wherein the wireless communication link is established based on a dedicated short-range communications (DSRC) technology.

5. The system of claim 1 wherein the hazardous condition is an obstacle on the route ahead of the second vehicle, and the sensor system includes a radar detection system for detecting the obstacle.

6. The system of claim 1 wherein the hazardous condition is an overspeed condition of the second vehicle, and wherein:

the processing unit is further configured to detect when the current speed of the second vehicle is greater than an allowable speed for the second vehicle at a future location of the second vehicle along the route; and
the communication module is further configured to notify the second vehicle of the allowable speed for the future location.

7. The system of claim 1 wherein:
the hazardous condition is a deviation from the route;
the unmanned vehicle further comprises a memory element in communication with the processing unit, the memory element having predetermined route information for the route stored therein;
the processing unit is further configured to detect the deviation from the route based at least in part on the predetermined route information; and
the communication module is further configured to notify the second vehicle of the deviation via the wireless communication link.

8. The system of claim 7 wherein:
the processing unit is further configured to determine a trajectory path for the second vehicle in response to the deviation; and the speed control unit is further configured to adapt the position of the unmanned vehicle such that the unmanned vehicle travels ahead of the second vehicle along the trajectory path.

9. The system of claim 8 wherein the communication module is further configured to redirect the second vehicle from the trajectory path to the route.

10. The system of claim 1 wherein:
the unmanned vehicle further comprises a memory element in communication with the processing unit, the memory element having predetermined route information for the route stored therein;
when no hazardous conditions are detected by the sensor system, the processing unit is further configured to determine an optimal speed for the second vehicle at a future location based at least in part on the predetermined route information; and
the communication module is further configured to notify the second vehicle of the optimal speed for the future location via the wireless communication link.

11. The system of claim 1 wherein:
the unmanned vehicle is a first unmanned vehicle, and the first unmanned vehicle further comprises:
a battery for providing electrical energy to enable movement of the unmanned vehicle; and
a battery monitor circuit coupled with the battery and configured to monitor a battery output voltage, wherein when the battery output voltage drops below a threshold value, the communication module is configured to send a trigger signal to the second vehicle via the wireless communication link; and
the system further comprises a second unmanned vehicle residing on the second vehicle, the second unmanned vehicle being configured to replace the first unmanned vehicle in response to receipt of the trigger signal at the second vehicle.

12. A method utilizing an unmanned vehicle to monitor a second vehicle moving along a route, the method being performed by the unmanned vehicle, and the method comprising:

determining a braking distance for the second vehicle in response to a current speed of the second vehicle, the braking distance characterizing a travel distance that the second vehicle will move from an initial location at which braking is initiated to a final location at which the second vehicle stops moving;
determining a leading distance of the unmanned vehicle with respect to the second vehicle based on the braking distance, wherein the leading distance is greater than the braking distance by an additional travel distance of the second vehicle corresponding to a processing overhead time required by the unmanned vehicle to detect the hazardous condition and a notification overhead time required by the unmanned vehicle to notify the second vehicle of the hazardous condition via a wireless communication link;
adjusting a guide speed and position of the unmanned vehicle such that the unmanned vehicle travels ahead of the second vehicle by at least the leading distance;
detecting a hazardous condition along the route ahead of the unmanned vehicle; and
notifying the second vehicle of the hazardous condition via the wireless communication link.

13. The method of claim 12 further comprising determining the braking distance based on at least the current speed, an elevation variability of the route, and a mass of the second vehicle.

14. The method of claim 12 wherein the current speed is a first current speed at a first instant in time, the braking distance is a first braking distance, the leading distance is a first leading distance, and the method further comprises:
- determining a second braking distance for the second vehicle in response to a second current speed of the second vehicle, the current speed differing from the first current speed;
- determining a second leading distance for the unmanned vehicle based on the second braking distance; and
- adjusting the guide speed and position of the unmanned vehicle such that the unmanned vehicle travels ahead of the second vehicle by at least the second leading distance.

15. The method of claim 12 wherein the unmanned vehicle further includes a radar detection system, the hazardous condition comprises an obstacle on the route ahead of the second vehicle, and the detecting operation comprises transmitting radar signals ahead of the unmanned vehicle via the radar detection system and receiving reflected radar signals, the reflected radar signals indicating the presence of the obstacle.

16. The method of claim 12 wherein the hazardous condition is an overspeed condition of the second vehicle, and the detecting operation comprises:
- determining when the current speed of the second vehicle is greater than an allowable speed for the second vehicle at a future location of the second vehicle along the route; and
- notifying the second vehicle of the allowable speed for the future location.

17. The method of claim 12 wherein the unmanned vehicle includes a memory element having predetermined route information for the route stored therein, the hazardous condition is a deviation of the second vehicle from the route, and the detecting operation comprises:
- identifying the deviation from the route based at least in part on the predetermined route information;
- notifying the second vehicle of the deviation via the wireless communication link;
- determining a trajectory path for the second vehicle in response to the deviation; and
- adapting the position of the unmanned vehicle such that the unmanned vehicle travels ahead of the second vehicle along the trajectory path.

18. The method of claim 12 wherein the unmanned vehicle further comprises a memory element in communication with the processing unit, the memory element having predetermined route information for the route stored therein, when no hazardous conditions are detected, the method further comprises:
- determining an optimal speed for the second vehicle at a future location based at least in part on the predetermined route information; and
- notifying the second vehicle of the optimal speed for the future location via the wireless communication link.

19. The method of claim 12 wherein the unmanned vehicle includes a battery for providing electrical energy to enable the unmanned vehicle to travel ahead of the second vehicle, and the method further comprises:
- monitoring unmanned vehicle to identify a trigger condition;
- when the trigger condition is detected, sending a trigger signal to the second vehicle via the wireless communication link; and
- replacing the unmanned vehicle with a second unmanned vehicle in response to receipt of the trigger signal at the second vehicle.

* * * * *